US008843384B2

(12) United States Patent
Eden

(10) Patent No.: US 8,843,384 B2
(45) Date of Patent: Sep. 23, 2014

(54) METHOD FOR SELECTING A SPATIAL ALLOCATION

(76) Inventor: Avinoam Eden, Chicago, IL (US)

(*) Notice: Subject to any disclaimer, the term of this patent is extended or adjusted under 35 U.S.C. 154(b) by 800 days.

(21) Appl. No.: 12/499,702

(22) Filed: Jul. 8, 2009

(65) Prior Publication Data

US 2010/0010840 A1 Jan. 14, 2010

Related U.S. Application Data

(60) Provisional application No. 61/079,540, filed on Jul. 10, 2008.

(51) Int. Cl.
*G06Q 10/00* (2012.01)
*G09B 29/00* (2006.01)
*G06F 3/0481* (2013.01)
*G06F 17/30* (2006.01)
*G06Q 10/02* (2012.01)

(52) U.S. Cl.
CPC ........... *G06F 3/0481* (2013.01); *G09B 29/007* (2013.01); *G06F 17/3087* (2013.01); *G06Q 10/02* (2013.01)
USPC .......................................................... 705/5

(58) Field of Classification Search
USPC .......................................................... 705/5
See application file for complete search history.

(56) References Cited

U.S. PATENT DOCUMENTS

| | | | | |
|---|---|---|---|---|
| 5,408,417 A * | 4/1995 | Wilder | | 705/5 |
| 6,216,139 B1 * | 4/2001 | Listou | | 715/209 |
| 6,330,600 B1 * | 12/2001 | Matchefts et al. | | 709/223 |
| 6,965,900 B2 * | 11/2005 | Srinivasa et al. | | 1/1 |
| 7,026,954 B2 * | 4/2006 | Slemmer et al. | | 340/932.2 |
| 7,117,199 B2 * | 10/2006 | Frank et al. | | 1/1 |
| 7,135,991 B2 * | 11/2006 | Slemmer et al. | | 340/932.2 |
| 7,158,878 B2 * | 1/2007 | Rasmussen et al. | | 701/431 |
| 7,454,361 B1 * | 11/2008 | Halavais et al. | | 705/5 |
| 7,496,445 B2 * | 2/2009 | Mohsini et al. | | 701/434 |
| 7,777,648 B2 * | 8/2010 | Smith et al. | | 340/995.1 |
| 7,783,530 B2 * | 8/2010 | Slemmer et al. | | 705/28 |
| 7,822,635 B1 * | 10/2010 | Brown et al. | | 705/14.1 |
| 7,849,133 B2 * | 12/2010 | Denker et al. | | 709/203 |
| 7,917,398 B2 * | 3/2011 | Gibson et al. | | 705/26.63 |
| 8,209,241 B2 * | 6/2012 | Gibson et al. | | 705/27.2 |
| 8,521,618 B2 * | 8/2013 | Gibson et al. | | 705/27.2 |
| 2002/0023041 A1 * | 2/2002 | Brett | | 705/37 |

(Continued)

OTHER PUBLICATIONS www.marketwired.com/press-release/stubhub-announces-launch-of-interactive-stubhub "Marketplace Uses New Technologies to Map the Future of Buying and Selling Tickets" Sep. 6, 2006.*

(Continued)

*Primary Examiner* — Shannon Campbell
(74) *Attorney, Agent, or Firm* — Klintworth & Rozenblat IP LLC

(57) ABSTRACT

A method of displaying a selected spatial allocation is provided. The method includes but is not limited to associating spatial allocation characteristic data stored in a database with corresponding spatial location data representing a location of a spatial allocation on the map. The method also includes but is not limited to, upon selection of the spatial allocation from the map, displaying the corresponding spatial allocation characteristic data from the database, along with the selected spatial allocation on the map, on a display. Additionally, the method includes but is not limited to, upon selection of the corresponding spatial allocation from the database, displaying the map, along with the selected spatial allocation in the map, on the display.

26 Claims, 5 Drawing Sheets

(56) References Cited

U.S. PATENT DOCUMENTS

| | | | |
|---|---|---|---|
| 2002/0082879 A1* | 6/2002 | Miller et al. | 705/5 |
| 2003/0069764 A1* | 4/2003 | Gathman et al. | 705/5 |
| 2003/0079222 A1* | 4/2003 | Boykin et al. | 725/31 |
| 2004/0078750 A1* | 4/2004 | Frank | 715/500 |
| 2007/0265892 A1* | 11/2007 | Valentino | 705/5 |
| 2008/0103934 A1* | 5/2008 | Gibson et al. | 705/27 |
| 2008/0255889 A1* | 10/2008 | Geisler et al. | 705/5 |
| 2008/0281644 A1* | 11/2008 | Payne | 705/5 |
| 2009/0164635 A1* | 6/2009 | Denker et al. | 709/226 |
| 2011/0320227 A1* | 12/2011 | Thomas et al. | 705/5 |
| 2012/0226589 A1* | 9/2012 | Geisler et al. | 705/27.1 |

OTHER PUBLICATIONS http://hannahmontanaticketreview.blogspot.com/2008/02/hannah-montana-concert-tickets "Hannah Montana—Multiple Tickets Available through Stubhub.com", Feb. 2, 2008.*

* cited by examiner

METHOD FOR SELECTING A SPATIAL ALLOCATION

CROSS REFERENCE TO RELATED APPLICATION

This application claims the benefit of U.S. Provisional Application No. 61/079,540 filed Jul. 10, 2008.

FIELD OF THE INVENTION

The present invention relates generally to selecting a spatial allocation. In particular, the invention relates to associating spatial allocation characteristic data for a spatial allocation with a corresponding location for the spatial allocation on a map.

BACKGROUND

Ticket sales have moved online, and payment structures and delivery structures have developed to the point where great numbers of tickets are sold through online retailers. The visualization and selection of a seat is performed using a traditional map, and listing tickets by location and prices. This often leaves a consumer deciphering the seating arrangement and browsing the list to find the best deals, while mentally visualizing the location of the tickets. This can be confusing, time consuming, and hassling for customers. Thus there is a need in the ticket sales field for new and useful method for selecting a spatial allocation. The invention provides such a new and useful method.

SUMMARY

In one aspect, a method of displaying a selected spatial allocation is provided. The method includes but is not limited to receiving map data representing a map at a remote device and receiving spatial allocation characteristic data at the remote device. The method also includes but is not limited to associating spatial allocation characteristic data stored in a database with a corresponding spatial location on the map and linking the database to the corresponding spatial location on the map. Upon selection of the spatial allocation from the database, the method includes but is not limited to displaying the map, along with the selected spatial allocation on the map, on a display of a local device.

In another aspect, a method of displaying a selected spatial allocation is provided. The method includes but is not limited to receiving map data representing a map at a remote device and receiving spatial allocation characteristic data at the remote device. The method also includes but is not limited to associating spatial allocation characteristic data stored in a database with a corresponding spatial location on the map and linking the database to the corresponding spatial location on the map. Upon selection of the spatial allocation from the map, the method includes but is not limited to displaying the corresponding spatial allocation characteristic data from the database, along with the selected spatial allocation on the map, on a display of a local device.

In another aspect, a method of displaying a selected spatial allocation is provided. The method includes but is not limited to associating spatial allocation characteristic data stored in a database with corresponding spatial location data representing a location of a spatial allocation on the map. The method also includes but is not limited to, upon selection of the spatial allocation from the map, displaying the corresponding spatial allocation characteristic data from the database, along with the selected spatial allocation on the map, on a display. Additionally, the method includes but is not limited to, upon selection of the corresponding spatial allocation from the database, displaying the map, along with the selected spatial allocation in the map, on the display.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

The present invention makes use of the discovery that by associating spatial allocation characteristic data for a spatial allocation with a corresponding location for the spatial allocation on a map, it is possible to interact with and select the spatial allocation characteristic data and view the location of the corresponding spatial allocation on the map, or to interact with and select the spatial allocation on the map and view the associated spatial allocation characteristic data for the selected spatial allocation.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

Figure 1:
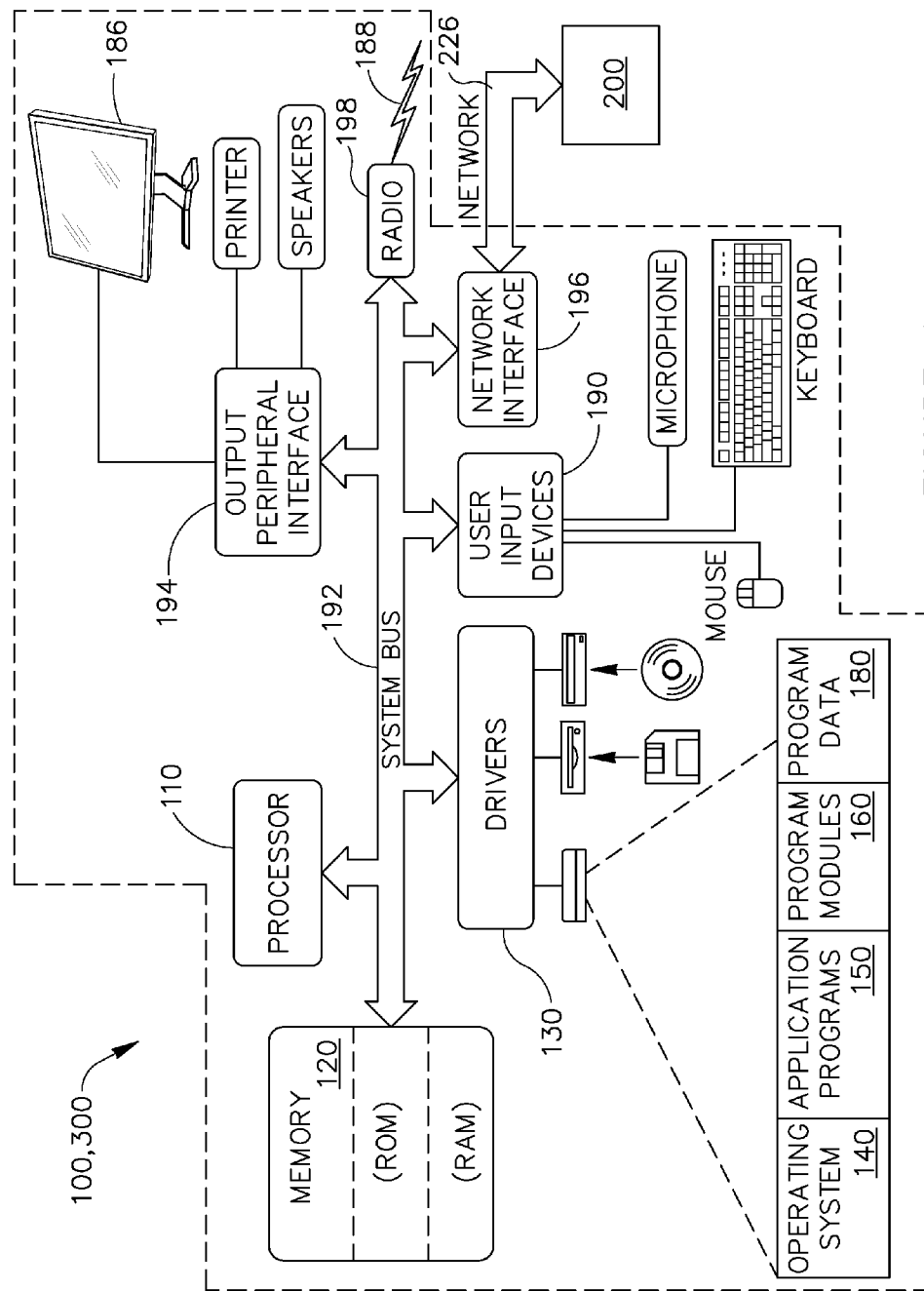
FIG. 1 depicts a block schematic diagram of an exemplary computing system, in accordance with one embodiment of the present invention.

With reference to FIG. 1, depicted is an exemplary computing system for implementing embodiments. FIG. 1 includes a computer 100, which could be any one of a remote device 200 or a local device 300. Computer 100 may be a mobile device, wherein at least some or all of its components are formed together in a single device which can move from one location to another, such as a laptop computer, a mobile telephone, a portable electronic device, or a personal digital assistant (PDA). Computer 100 may be a stationary or non-mobile device which is not moved around, such as a desktop computer or server. Remote device 200 or local device 300 may be either a mobile device or a non-mobile device. The computer 100 includes a processor 110, memory 120 and one or more drives 130. The drives 130 and their associated computer storage media provide storage of computer readable instructions, data structures, program modules and other data for the computer 100. Drives 130 can include an operating system 140, application programs 150, program modules 160, and program data 180. Computer 100 further includes input devices 190 through which data may enter the computer 100, either automatically or by a user who enters commands and data. Input devices 190 can include an electronic digitizer, a microphone, a camera, a video camera, a keyboard and a pointing device, commonly referred to as a mouse, trackball or touch pad. Other input devices may include a joystick, game pad, satellite dish, scanner, and the like. In one or more embodiments, input devices 190 are mobile devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers and/or a display device 186, which may be connected through an output peripheral interface 194 and the like. Display device 186 is any device which can display an image and includes things such as LCD displays, plasma displays, cathode ray tube displays, OLED displays, LED displays, and projectors.

Computer 100 also includes a radio 198 for wirelessly transmitting and receiving data for the computer 100 with the aid of an antenna. Radio 198 may wirelessly transmit and receive data using any present wireless standard such as WiMAX™, 802.11a/b/g/n, Bluetooth™, 2G, 2.5G, 3G, and 4G. Additionally, radio 198 may receive positioning signals 188, such as global positioning satellite (GPS) signals from a global positioning satellite or cellular signals for determining its position via triangulation. By using the positioning signals 188, the radio 198 is able to determine its location.

Computer 100 may operate in a networked environment using logical connections to one or more remote devices 200. A remote device 200 is any computer 100 which is remotely located from a user and connected with a device accessible by the user, such as a local device 300, through a network 226. A local device 300 is any computer 100 which is accessible by the user. Remote device 200 and local device 300 may be a personal computer, a workstation computer, a server computer, a router, a networked personal computer, a peer device or other common network node, a laptop computer, a mobile telephone, a portable electronic device, or a personal digital assistant (PDA), and may include many if not all of the elements described above relative to computer 100.

Networking environments are commonplace in offices, enterprise-wide computer networks, intranets and the Internet. For example, in the subject matter of the present application, computer 100 may comprise the local device 300 from which data is being migrated, and the remote device 200 may comprise the destination machine. Note, however, that source and destination machines need not be connected by a network or any other means, but instead, data may be migrated via any media capable of being written by the source platform and read by the destination platform or platforms. When used in a local area network (LAN), a wireless local area network (WLAN), or a wide area network (WAN) networking environment, computer 100 is connected to the network 226 through a network interface 196 or an adapter. When used in a WAN networking environment, computer 100 typically includes a modem or other means for establishing communications over the WAN to environments such as the Internet. It will be appreciated that other means of establishing a communications link between computer 100 and another computer or device, such as remote device 200, may be used.

Figure 2:
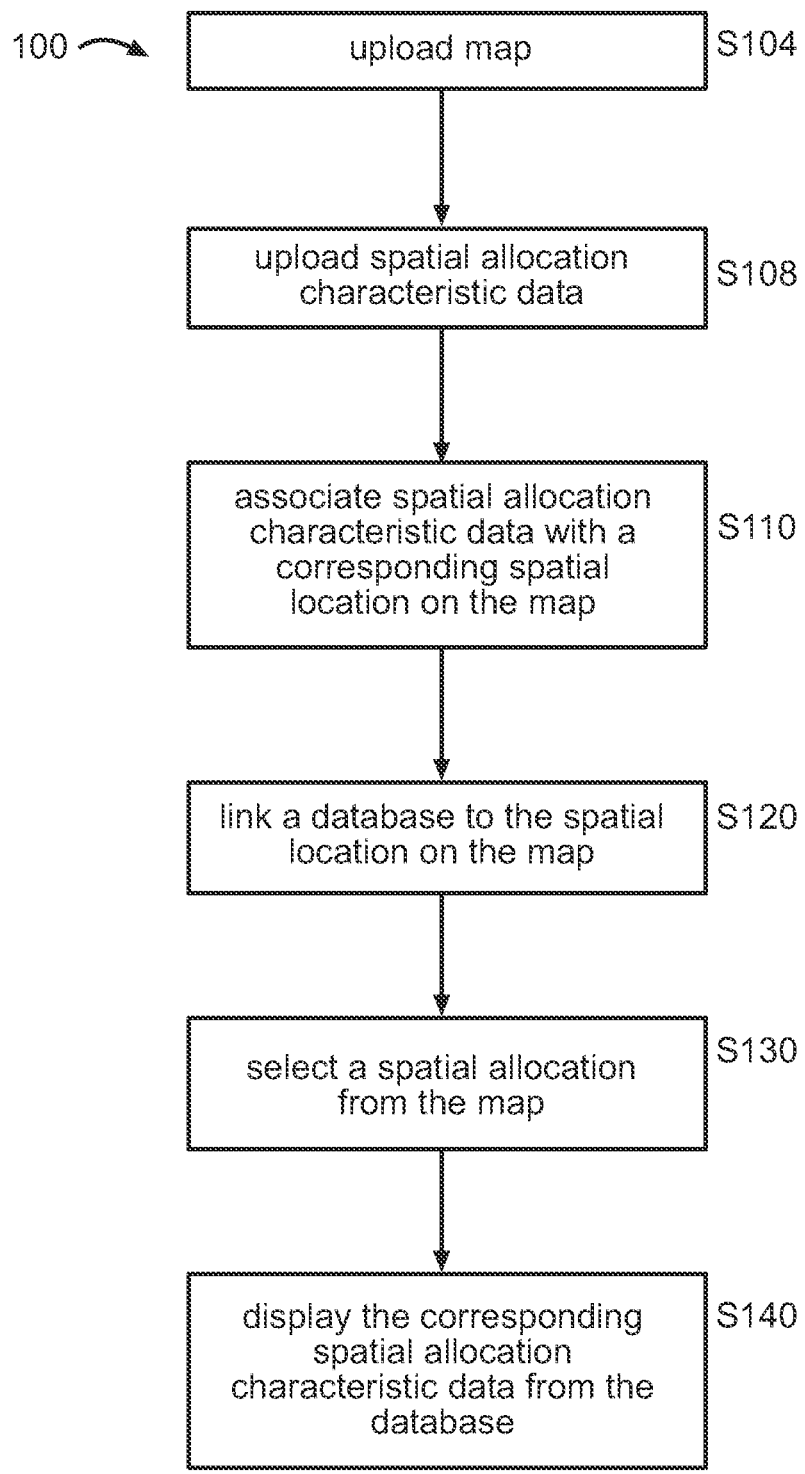
FIG. 2 depicts a flowchart representation of a first method for selecting a spatial allocation, in accordance with one embodiment of the present invention.
Figure 4:
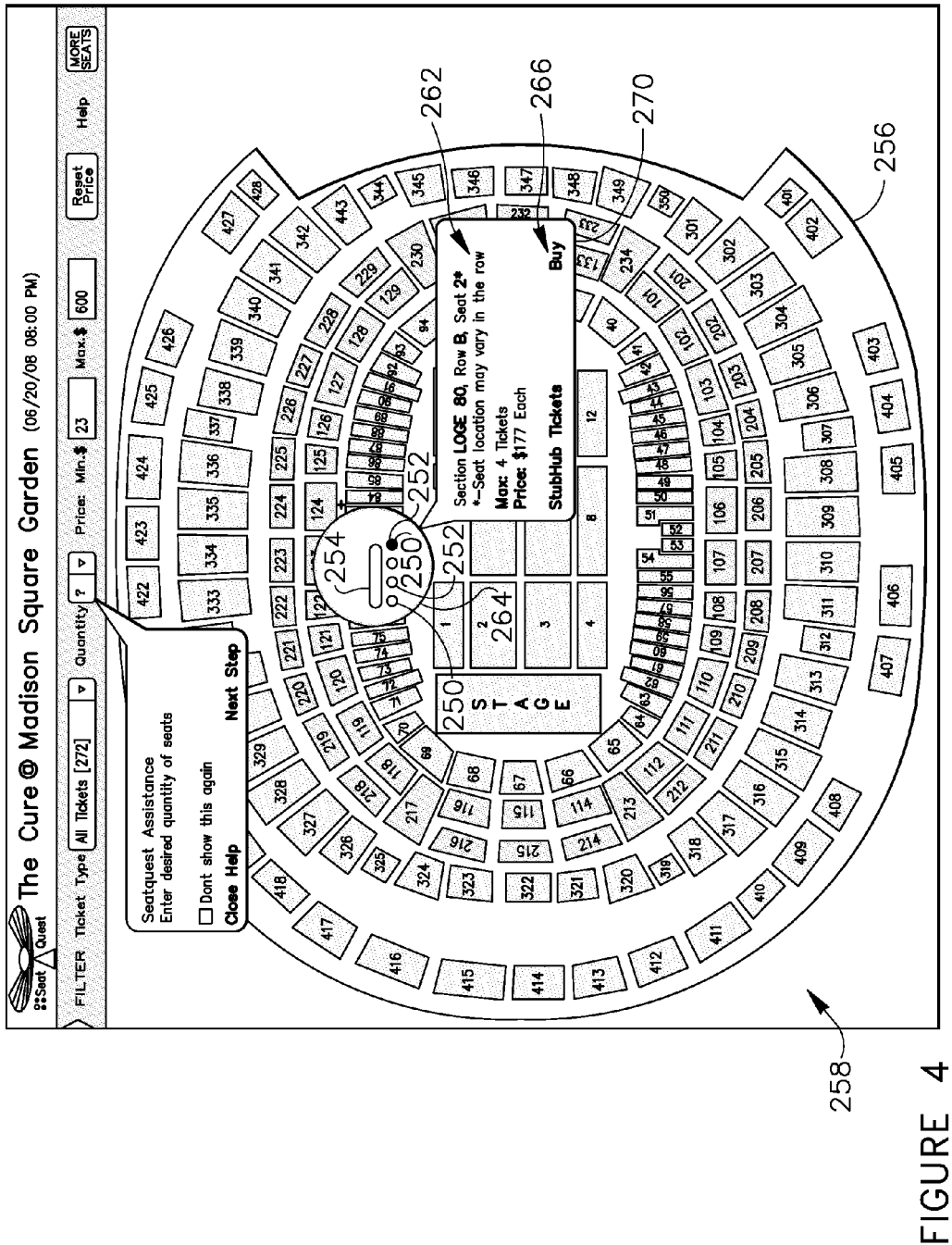
FIG. 4 depicts an exemplified representation of a display of the first method for selecting a spatial allocation, in accordance with one embodiment of the present invention.

With reference to FIGS. 2 and 4, a first preferred method 100 of selecting a spatial allocation 250 is provided. As defined herein, a spatial allocation 250 is any item which takes up space and may be set aside for a specified purpose. A spatial allocation 250 may be reserved and includes things such as seats, rows, or sections within a venue, such as a stadium, a concert hall, a theater, a raceway, a lawn, a classroom, or a hall; seats, rows, or sections within a vehicle, such as a train, a bus, an airplane, and a ship; rooms or beds within a hotel, a ship, or other venue; seats or tables within a restaurant; and parking spaces or cars within a parking lot. Preferably, the spatial allocation 250 is a seat 252 or a row 254 within a venue 256. The venue 256 may host an event, such as a concert, a sporting arrangement, a theater performance, a musical performance, a motion picture, a seminar, and a class.

The first preferred method 100 of selecting a spatial allocation 250 includes uploading a map 258 (S104) to a computer 100, and receiving the uploaded map 258 at the computer 100, uploading spatial allocation characteristic data 260 (S108) to a computer 100, and receiving the uploaded spatial allocation characteristic data 260 at the computer 100, associating spatial allocation characteristic data 260 with a corresponding spatial location on the map 258 (S110), linking a database to the spatial location on the map 258 (S120), selecting a spatial allocation 250 from the map 258 (S130), and displaying the corresponding spatial allocation characteristic data 260 from the database (S140). The first preferred method 100 preferably enables a user interested in a spatial allocation 250 to view available spatial allocations 250 based primarily on the location of the spatial allocation 250, also known herein as the spatial location, thus reducing or eliminating the need for a user to mentally process spatial allocation characteristic data 260 before choosing a spatial allocation 250. Selecting spatial allocations 250 preferably relates to selling tickets, and more preferably relates to selecting seats at a ticketed stadium, a concert venue, or a movie theater, but may alternatively relate to selecting seats within a vehicle, selecting rooms or beds within a hotel, or any other suitable, reservable space which may be set aside for a specified purpose.

Step S104, which includes uploading a map 258 to a computer 100, and receiving the uploaded map 258 at the computer 100, functions to upload a map 258 of a spatial allocation 250, and preferably a map 258 of a plurality of spatial allocations 250, as shown in FIG. 4. Step S104 also functions to receive the uploaded map 258 at the computer 100. Preferably, the computer 100 is a remote device 200 which is connected with at least one local device 300 through a network 226, preferably through the Internet. Preferably, the map 258 is uploaded to and received by remote device 200 as map data, whereupon the map data is then stored on the remote device 200. Map data contains information which represents the map 258 and can be used to digitally recreate the map 258. Preferably, the remote device 200 is connected to other computers 100 via a network 226. The map 258 illustrates the location a spatial allocation 250 and preferably, the location of a spatial allocation 250 with respect to the location of other spatial allocations 250. The map 258 is preferably of a venue, but may alternatively be of a vehicle (e.g., on a bus, a train, an airplane, or a ship), a hotel, a restaurant, a parking lot, or any other suitable, reservable space which may be set aside for a specified purpose. A venue map preferably corresponds to seats for an event, such as a concert, a sporting arrangement, a theater performance, a musical performance, a motion picture, a seminar, or a class. The map 258 may alternatively be used to identify the location of seats on a vehicle, the location of seats or tables in a restaurant, the location of hotel rooms within a hotel, or the location of any other suitable spatial allocation 250. The venue map is preferably a 2-dimensional representation of a venue 256, but may alternatively include a 3-dimensional representation or model of the venue 256, 3-dimensional map rendering instructions, or geo-coordinates.

Step S108, which includes uploading spatial allocation characteristic data 260 to a computer 100, and receiving the uploaded spatial allocation characteristic data 260 at the computer 100, functions to provide data describing at least one aspect of the spatial allocation 250 or plurality of spatial allocations 250. Step S108 also functions to receive the uploaded spatial allocation characteristic data 260 at the computer 100. Preferably, the computer 100 is a remote device 200 which is connected with at least one local device 300 through a network 226, preferably through the Internet. Preferably, the spatial allocation characteristic data 260 is uploaded to and received by remote device 200, whereupon the spatial allocation characteristic data 260 is then stored on the remote device 200. Preferably, the computer 100 receiving the uploaded spatial allocation characteristic data 260 is the same computer receiving the uploaded map 258.

Preferably, the spatial allocation characteristic data 260 is uploaded to remote device 200 which is connected to other computers 100 via a network 226. The spatial allocation characteristic data 260 includes a feature or characteristic of a spatial allocation 250, and preferably, a feature or characteristic of a spatial allocation 250 which is available for selection by a user and located on the map 258. For example, in one embodiment, the spatial allocation characteristic data 260 is seat characteristic data in which the feature or characteristic preferably includes at least one of a price; a seat number; a section number and/or a row number; availability; a date and time of availability; ergonomic information, including a type of material, color, contour, lumbar support, and armrest information; a distance to a restroom; and a distance to a focus of an event (e.g. the distance to a concert stage, the distance to a 50 yard line, or the distance to a home plate). In an alternative embodiment, where the spatial allocation 250 is a room in a hotel, and where the feature or characteristic preferably include certain room properties, such as number of beds, size of room, amenities, etc. may be specified for the room. The spatial allocation characteristic data 260 is preferably stored in a first database, preferably located in the remote device 200.

Step S110, which includes associating spatial allocation characteristic data 260 with a corresponding spatial location on the map 258, functions to associate the location of a spatial allocation 250 on the map 258, the spatial location, with corresponding spatial allocation characteristic data 260. Step S110 is preferably performed on the remote device 200, but may be performed by any computer 100 which has access to the first database and map data located on the remote device 200. The spatial location can be represented by coordinates or other allocated space coordinates. The spatial location on the map 258 is preferably represented in x-y coordinates, but polar coordinates, x-y-z coordinates, GPS coordinates, or any other suitable coordinate system may be used to represent and mark the spatial location, that is, the location of a spatial allocation 250. In an alternative variation, each coordinate is assigned a unique address (e.g. a hashed location) and is stored in a second database, preferably located on the remote device 200. This association may be performed by estimating the number of map pixels per seat 252 (or spatial allocation 250), or reducing the resolution of a 2-dimensional map such that each spatial allocation 250 is represented by a specific number of pixels.

Step S120, which includes linking the first database to the spatial location on the map 258, and more specifically, to spatial location data stored with the map data. The spatial location data includes information on the location of the spatial allocation 250, such as x-y coordinates, polar coordinates, x-y-z coordinates, GPS coordinates, or any other suitable system which may be used to represent and mark the spatial location. Step S120 functions to link spatial location data with spatial allocation characteristic data 260. In one embodiment, Step 120 functions to link data which represents the location of a seat 252 or row 254 within a venue 256 with seat characteristic data stored in the first database, such that the characteristics of the seat 252 (e.g. date, time, price, amenities) are linked with the seat location on the map 258. Step S120 is preferably performed on the remote device 200 by adding seat location data (e.g. coordinates or a unique identifier/address) into the first database containing seat characteristic data (e.g. an event moving between venues 256), or alternatively by adding seat characteristic data to a seat coordinate database (to adapt a venue map for use with different events).

In one embodiment, the spatial allocation characteristic data 260 stored in the first database on the remote device 200 is displayed in some manner, such as in a chart or table, on a display 186 connected with the local device 300. Additionally, the map data stored in the remote device 200 is displayed as some sort of map 258, such as a 2-dimensional map, on the display 186.

Step S130, which includes selecting a spatial allocation 250 from the map 258, functions to enable a prospective user to browse the displayed map 258 globally, and select a spatial allocation 250 from among the spatial allocations 250 displayed on the map 258. Preferably, when the displayed spatial characteristic data 260 is selected by manipulating an input device such as a mouse, trackpad, or keyboard, the spatial allocation 250, and preferably the location of the spatial allocation 250, is highlighted on the displayed map 258. Preferably, when the displayed spatial allocation 250 is selected or highlighted, additional spatial allocation characteristic data 262 is displayed near the highlighted spatial allocation 250.

Preferably, the spatial allocation 250 can be more easily found, selected, and viewed using a movable magnifier 264 (as exemplified in FIG. 4), which magnifies the map 258 and provides an enlarged view of the seats 252 available in a particular subsection of the map 258. Alternatively, for a very large venue map, the seat selection may include zooming in on portions of the map 258 (i.e. redirecting to a map of a subsection of the map 258). As also exemplified in FIG. 4, the displayed spatial allocation characteristic data 260 is preferably filterable by specific characteristics, such as price and quantity of seats 252.

Step S140, which includes displaying the corresponding spatial allocation characteristic data 260 from the first database, functions to display characteristic data corresponding to the selected spatial allocation 250 on a display 186, preferably of a local device 200. For example, if a specific seat 252 is selected on the map 258, then seat characteristic data, such as the seat location, the seat number, the price of the seat, the availability of the seat 252, or any other suitable seat characteristic data corresponding to the selected seat 252 is displayed and preferably highlighted on the display 186, preferably next to the selected seat. Preferably, the corresponding spatial allocation characteristic data 260 includes spatial allocation characteristic data 260 for more than just the selected spatial allocation 250, and preferably includes spatial allocation characteristic data 260 for additional spatial allocations 250. The additional spatial allocations 250 are preferably selected from the first database based upon their corresponding location data, so that for example, spatial allocations 250 which are near a selected spatial allocation 250 are deemed additional spatial allocations 250. As used herein, the term "near" refers to a spatial allocation or spatial allocations which are closest to the selected spatial allocation, and includes spatial allocations which are in the same row or section of a venue or a vehicle of the selected spatial allocation, spatial allocations which are on the same floor or closest floors of a hotel of the selected spatial allocation, spatial allocations which are at the nearest tablets or seats in a restaurant of the selected spatial allocation, or spatial allocations which are in the same row or closest rows of cars within a parking lot of the selected spatial allocation.

If a list of spatial locations data for a number of spatial allocations 250 is already displayed, the displayed list is preferably updated with the spatial allocation characteristic data 260 for the selected spatial allocation 250 along with spatial allocation characteristic data 260 for the additional spatial allocations 250. Additionally, a historical list of spatial allocation characteristic data 260 for a user's recently viewed or selected spatial allocations 250 may also be displayed for comparison to the currently selected spatial allocation 250.

Figure 5:
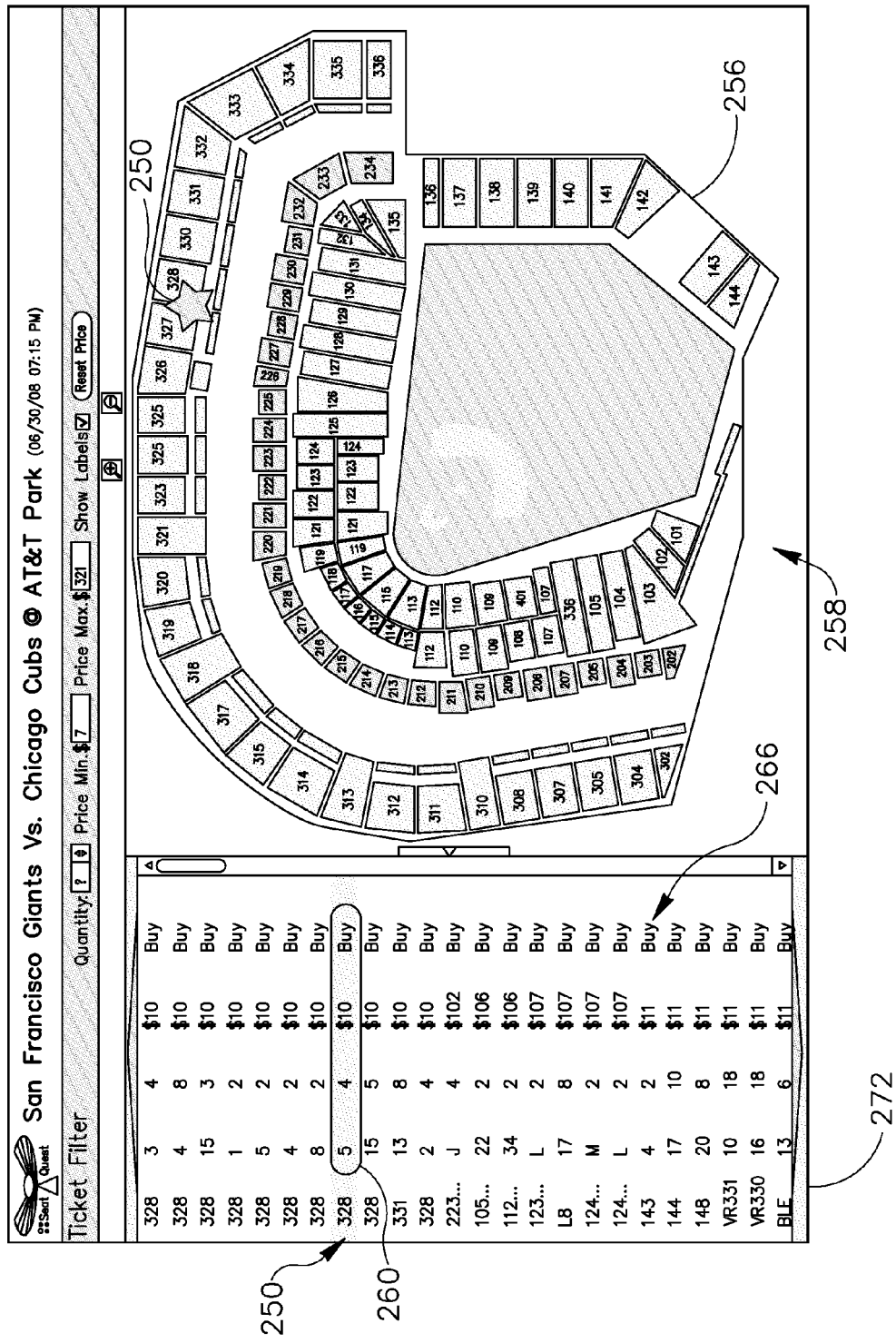
FIG. 5 an exemplified representation of a display of the second method for selecting a spatial allocation, in accordance with one embodiment of the present invention.

Preferably, the corresponding spatial allocation 250 is displayed on the map 258 along with the corresponding spatial allocation characteristic data 260 from the first database. Preferably, the corresponding spatial allocation characteristic data 260 is displayed in a chart or table 272 next to the map 258, all on a display 186, as shown in FIG. 5. Preferably, as the user scrolls down the chart or table 272 or moves a curser through the chart or table 272, various spatial allocation characteristic data 260 is highlighted causing the corresponding locations for the spatial allocations 250 to be also highlighted on the map 258. In this manner, the user is able to quickly and efficiently view various spatial allocation characteristic data 260 along and see the corresponding locations for the spatial allocations 250 for which the highlighted spatial allocation characteristic data 260 corresponds to.

As exemplified in FIG. 4, the spatial allocation characteristic data 260 for the selected spatial allocation 250 may also be displayed in a popup help bubble 270 pointing to the selected spatial allocation 250 and next to the selected spatial allocation 250, however, any other suitable display of the spatial allocation characteristic data 260 may be used. The displayed spatial allocation characteristic data 260 preferably includes a link 266 to a commercial transaction (e.g. buying, reserving, layaway, leasing or renting of a spatial allocation 250), more preferably purchasing tickets, but may alternatively arranging an option to purchase tickets later while locking in the current price of the ticket.

Figure 3:
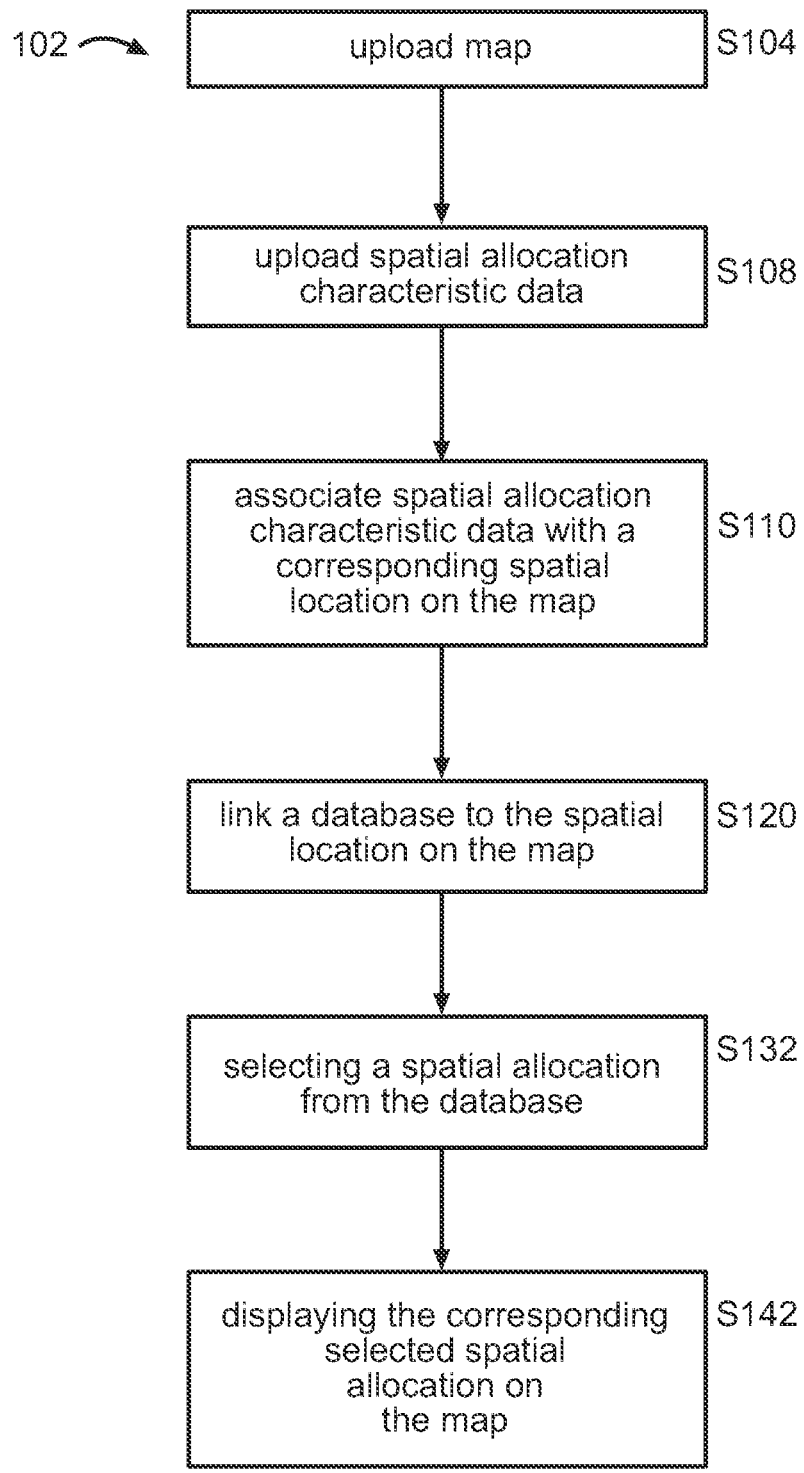
FIG. 3 depicts a flowchart representation of a second method for selecting a spatial allocation, in accordance with one embodiment of the present invention.

As shown in FIG. 3, a second preferred method 102 of selecting a spatial allocation 250 includes uploading a map 258 (S104), uploading spatial allocation characteristic data 260 (S108), associating spatial allocation characteristic data 260 with a corresponding spatial location on the map 258 (S110), linking a database to the spatial location on the map 258 (S120), selecting a spatial allocation 250 from the database (S132), and displaying the corresponding selected spatial allocation 250 on the map 258 (S142). The second preferred method of the invention enables a user to view spatial locations based primarily on the spatial allocation characteristic data 260, in order to make a faster decision.

Step S132, which recites selecting a spatial allocation 250 from a first database, functions to allow a user to select a spatial allocation 250 from a displayed list of spatial allocations 250 and spatial allocation characteristic data 260 (e.g. lowest price, highest price, closest to event focus) stored in a first database. A user preferably selects a spatial allocation 250 using spatial allocation characteristic data 260 from a displayed list produced from the first database. As also exemplified in FIG. 5, a displayed spatial allocation 250 is preferably filterable by spatial allocation characteristic data 260, such as seat characteristic data which may include price of seats and quantity of seats. The displayed spatial allocation characteristic data 260 preferably includes a link 266 to a commercial transaction (e.g. buying, reserving, layaway, leasing or renting of a spatial allocation 250), such as the purchasing of tickets for a seat 252, but may alternatively arrange an option to purchase tickets for a seat 252 later while locking in the current price for that seat 252.

Step S142, which recites displaying the corresponding selected spatial allocation 250 on the map 258, functions to display a spatial allocation 250 selected from a list of spatial allocations 250 (and corresponding spatial allocation characteristic data 260 of each spatial allocation 250) and highlight the spatial location on the map 258, on a display 186, preferably of a local device 200. The spatial location, which corresponds to the location of a selected spatial allocation 250, is preferably highlighted in a fashion that grabs a users attention, and is easily noticed. As shown in FIGS. 4-5, the highlighting of the spatial location on the map 258 is preferably done by using a different color or shade of color (exemplified in FIG. 4), or is a pulsating color, star, or other object (exemplified in FIG. 5) or other suitable visual differentiation.

Upon displaying the corresponding selected spatial allocation 250 on the map 258 in step S142, the spatial allocation characteristic data 260 for the selected spatial allocation 250 may also be displayed in a popup help bubble 270 pointing to the selected spatial allocation 250 and next to the selected spatial allocation 250, however, any other suitable display of the spatial allocation characteristic data 260 may be used. The displayed spatial allocation characteristic data 260 preferably includes a link 266 to a commercial transaction (e.g. buying, reserving, layaway, leasing or renting of a spatial allocation 250), more preferably purchasing tickets, but may alternatively arranging an option to purchase tickets later while locking in the current price of the ticket.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computers), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A computer-implemented method of displaying a selected spatial allocation, the method comprising:
 receiving map data representing a map at a remote device;
 receiving spatial allocation characteristic data at the remote device;
 associating spatial allocation characteristic data stored in a database with a corresponding spatial location on the map;
 linking in a computer the database to the corresponding spatial location on the map; and linking in a computer the database to the corresponding spatial location on the map; and displaying the selected spatial allocation on the map, and displaying the corresponding spatial allocation characteristic data from the database in a table next to the map, all on a display of a local device,
 wherein the corresponding spatial allocation characteristic data includes spatial allocation characteristic data for additional spatial allocations, wherein as a user moves a curser through the map and over the spatial allocation on the map and selects the spatial allocation on the map, the spatial allocation on the map is highlighted, and wherein the corresponding spatial allocation characteristic data in the table is also highlighted or displayed.

2. The method of claim 1, wherein the selected spatial allocation is one of:
a seat or row within a venue or a vehicle;
a room or bed within a hotel;
a seat or table within a restaurant; and
a parking space or car within a parking lot.

3. The method of claim 1, wherein the selected spatial allocation is one of a seat and a row within a venue.

4. The method of claim 1, further comprising displaying spatial allocation characteristic data for the selected spatial allocation next to the selected spatial allocation.

5. The method of claim 4, wherein the spatial allocation characteristic data is displayed in a popup help bubble pointing to the selected spatial allocation.

6. The method of claim 1, further comprising generating a movable magnifier which magnifies the map and provides an enlarged view of a particular subsection of the map.

7. A computer-implemented method of displaying a selected spatial allocation, the method comprising:
receiving map data representing a map at a remote device;
receiving spatial allocation characteristic data at the remote device;
associating spatial allocation characteristic data stored in a database with a corresponding spatial location on the map;
linking in a computer the database to the corresponding spatial location on the map; and
upon selection of the spatial allocation from the map, displaying the corresponding spatial allocation characteristic data from the database in a table next to the map, along with the selected spatial allocation on the map, all on a display of a local device,
wherein the corresponding spatial allocation characteristic data includes spatial allocation characteristic data for additional spatial allocations, wherein as a user moves a curser through the map and over the spatial allocation on the map, the spatial allocation on the map is highlighted, and wherein the corresponding spatial allocation characteristic data in the table is also highlighted.

8. The method of claim 7, further comprising displaying spatial allocation characteristic data for the selected spatial allocation next to the selected spatial allocation.

9. The method of claim 8, wherein the spatial allocation characteristic data is displayed in a popup help bubble pointing to the selected spatial allocation.

10. The method of claim 7, wherein corresponding spatial allocation characteristic data includes spatial allocation characteristic data for more than just the selected spatial allocation.

11. The method of claim 10, wherein the corresponding spatial allocation characteristic data includes spatial allocation characteristic data for additional spatial allocations which are near the selected spatial allocation.

12. The method of claim 11, wherein the additional spatial allocations are selected from the database based upon their corresponding location data.

13. A computer-implemented method of displaying a selected spatial allocation on a map, the method comprising:
associating spatial allocation characteristic data stored in a database of a computer with corresponding spatial location data representing a location of a spatial allocation on the map;
displaying the corresponding spatial allocation characteristic data from the database in a table next to the map, along with the selected spatial allocation on the map, all on a display; and
wherein the corresponding spatial allocation characteristic data includes spatial allocation characteristic data for additional spatial allocations, wherein as a user moves a curser through the map and over the spatial allocation on the map, the spatial allocation on the map is highlighted, and wherein the corresponding spatial allocation characteristic data in the table is also highlighted.

14. The method of claim 13, wherein the selected spatial allocation is one of:
a seat or row within a venue or a vehicle;
a room or bed within a hotel;
a seat or table within a restaurant; and
a parking space or car within a parking lot.

15. The method of claim 1, further comprising displaying spatial allocation characteristic data for the selected spatial allocation next to the selected spatial allocation.

16. The method of claim 1, further comprising generating a movable magnifier which magnifies the map and provides an enlarged view of a particular subsection of the map.

17. The method of claim 13, wherein corresponding spatial allocation characteristic data includes spatial allocation characteristic data for more than just the selected spatial allocation.

18. The method of claim 17, wherein the corresponding spatial allocation characteristic data includes spatial allocation characteristic data for additional spatial allocations.

19. The method of claim 18, wherein the additional spatial allocations are selected from the database based upon their corresponding location data.

20. The method of claim 13, wherein the associating of spatial allocation characteristic data and the linking of the database is conducted on a remote device, wherein the display is connected with a local device, and wherein the remote device is connected with the local device via a network.

21. The method of claim 1, further comprising displaying a historical list of spatial allocation characteristic data for a user's recently viewed or selected spatial allocations for comparison to the currently selected spatial allocation.

22. The method of claim 1, wherein the displayed spatial allocation characteristic data includes a link to a commercial transaction.

23. The method of claim 7, further comprising displaying a historical list of spatial allocation characteristic data for a user's recently viewed or selected spatial allocations for comparison to the currently selected spatial allocation.

24. The method of claim 7, wherein the displayed spatial allocation characteristic data includes a link to a commercial transaction.

25. The method of claim 13, further comprising displaying a historical list of spatial allocation characteristic data for a user's recently viewed or selected spatial allocations for comparison to the currently selected spatial allocation.

26. The method of claim 13, wherein the displayed spatial allocation characteristic data includes a link to a commercial transaction.

* * * * *